United States Patent
Lian et al.

(10) Patent No.: US 12,384,245 B2
(45) Date of Patent: Aug. 12, 2025

(54) VEHICLE AND METHOD AND APPARATUS FOR CONTROLLING MULTI-SCREEN SYSTEM

(71) Applicant: BYD COMPANY LIMITED, Shenzhen (CN)

(72) Inventors: Yubo Lian, Shenzhen (CN); Yilin Zhong, Shenzhen (CN); Na Zhao, Shenzhen (CN); Qun Liang, Shenzhen (CN); Bei Peng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 596 days.

(21) Appl. No.: 17/439,096

(22) PCT Filed: Mar. 12, 2020

(86) PCT No.: PCT/CN2020/079039
§ 371 (c)(1),
(2) Date: Sep. 14, 2021

(87) PCT Pub. No.: WO2020/187129
PCT Pub. Date: Sep. 24, 2020

(65) Prior Publication Data
US 2022/0144085 A1   May 12, 2022

(30) Foreign Application Priority Data
Mar. 20, 2019   (CN) .......................... 201910213962.8

(51) Int. Cl.
G09F 9/302   (2006.01)
B60K 35/00   (2006.01)
(Continued)

(52) U.S. Cl.
CPC .............. *B60K 35/00* (2013.01); *B60K 35/10* (2024.01); *B60K 35/22* (2024.01); *B60K 35/28* (2024.01);
(Continued)

(58) Field of Classification Search
CPC ........ B60K 35/00; B60K 35/10; B60K 35/22; B60K 35/28; B60K 35/29; B60K 35/53;
(Continued)

(56) References Cited

U.S. PATENT DOCUMENTS

| 7,040,699 | B2 | 5/2006 | Curran et al. | |
| 2005/0146845 | A1* | 7/2005 | Moscovitch | ........ B60R 11/0235 |
| | | | | 361/679.27 |

(Continued)

FOREIGN PATENT DOCUMENTS

| CN | 201254145 Y | 6/2009 |
| CN | 201472258 U | 5/2010 |

(Continued)

OTHER PUBLICATIONS

The World Intellectual Property Organization (WIPO) International Search Report for PCT/CN2020/079039 Mar. 20, 2020 4 pages (with translation).

*Primary Examiner* — Lunyi Lao
*Assistant Examiner* — Jarurat Suteerawongsa
(74) *Attorney, Agent, or Firm* — Wenye Tan (57) ABSTRACT

A method for controlling a multi-screen system includes acquiring a control instruction for the multi-screen system; and controlling a plurality of display screens to move according to the control instruction. The multi-screen system includes a plurality of display screens and a driving mechanism configured to drive the plurality of display screens to move in space.

18 Claims, 4 Drawing Sheets

(51) Int. Cl.
  *B60K 35/10* (2024.01)
  *B60K 35/22* (2024.01)
  *B60K 35/28* (2024.01)
  *B60K 35/29* (2024.01)
  *B60K 35/53* (2024.01)
  *B60K 35/65* (2024.01)
  *B60K 35/81* (2024.01)

(52) U.S. Cl.
  CPC .............. *B60K 35/29* (2024.01); *B60K 35/53* (2024.01); *B60K 35/658* (2024.01); *B60K 35/81* (2024.01); *B60K 2360/149* (2024.01); *B60K 2360/167* (2024.01); *B60K 2360/182* (2024.01)

(58) Field of Classification Search
  CPC  B60K 35/658; B60K 35/81; B60K 2360/149; B60K 2360/167; B60K 2360/182; F16M 11/08; F16M 11/18; F16M 11/2078; F16M 11/2085; F16M 11/2092; F16M 11/24; F16M 13/02; B60R 2011/0084; B60R 2011/0085; B60R 2011/0092; B60R 11/0235; B60R 11/0229; G09F 21/049; G09F 27/00; G09F 9/302
  See application file for complete search history.

(56) References Cited

U.S. PATENT DOCUMENTS

| | | | | |
|---|---|---|---|---|
| 2006/0109197 A1* | 5/2006 | Kuwabara | .............. | B60K 35/00 345/1.1 |
| 2008/0010875 A1* | 1/2008 | Kuwabara | ........... | B60R 11/0235 40/424 |
| 2013/0147847 A1* | 6/2013 | Koseki | ................ | B60R 11/0235 345/660 |
| 2014/0263890 A1* | 9/2014 | McCarthy | .............. | F16M 13/02 29/428 |
| 2016/0009178 A1 | 1/2016 | Busse et al. | | |
| 2016/0037924 A1 | 2/2016 | Bromley | | |
| 2016/0340042 A1* | 11/2016 | Peuziat | .................... | F16M 11/14 |
| 2017/0322760 A1* | 11/2017 | Soh | ........................ | G06F 3/1431 |
| 2018/0011551 A1* | 1/2018 | Gothlin | .................... | G06F 3/016 |
| 2020/0137905 A1* | 4/2020 | Redeker | ................. | G06F 1/1601 |
| 2021/0162931 A1* | 6/2021 | Bruegl | ............... | F16M 11/2028 |
| 2022/0075191 A1* | 3/2022 | Rittger | ............... | G02B 27/0101 |

FOREIGN PATENT DOCUMENTS

| | | | | |
|---|---|---|---|---|
| CN | 101791962 A | 8/2010 | | |
| CN | 102323829 A | 1/2012 | | |
| CN | 102431503 A | 5/2012 | | |
| CN | 102495712 A | 6/2012 | | |
| CN | 202422617 U | 9/2012 | | |
| CN | 102444765 B | 6/2013 | | |
| CN | 103140382 A | 6/2013 | | |
| CN | 103423564 A | 12/2013 | | |
| CN | 102495712 B | 2/2014 | | |
| CN | 104199552 A | 12/2014 | | |
| CN | 104778905 A | 7/2015 | | |
| CN | 106873765 A | 6/2017 | | |
| CN | 207623956 U | 7/2018 | | |
| CN | 208172728 U | 11/2018 | | |
| CN | 109377875 A | 2/2019 | | |
| DE | 102016218003 A1 * | 3/2018 | ............. | B60K 35/00 |
| DE | 202018101490 U1 | 6/2018 | | |
| EP | 1114981 A2 | 7/2001 | | |
| EP | 3165405 A1 * | 5/2017 | | |
| EP | 3346457 A1 | 7/2018 | | |
| FR | 3050562 A1 * | 10/2017 | ............. | B60K 35/00 |
| JP | 10198286 A | 7/1998 | | |

* cited by examiner

Vehicle

Apparatus for controlling multi-screen system 100

FIG. 13

VEHICLE AND METHOD AND APPARATUS FOR CONTROLLING MULTI-SCREEN SYSTEM

CROSS-REFERENCE TO RELATED APPLICATIONS

This application is a national phase entry under 35 U.S.C. § 371 of International Application No. PCT/CN2020/079039, filed on Mar. 12, 2020, which claims priority to Chinese Patent application Ser. No. 20/191,0213962.8 filed by the BYD Co., Ltd. on Mar. 20, 2019, and entitled VEHICLE AND METHOD AND APPARATUS FOR CONTROLLING MULTI-SCREEN SYSTEM, the entire contents of all of which are incorporated herein by reference in their entirety.

FIELD

The present disclosure relates to the technical field of vehicles, and in particular, to a vehicle and a method and apparatus for controlling a multi-screen system.

BACKGROUND

With the development of automotive electronics technology, users have higher and higher requirements on in-vehicle multimedia display screens. Multi-screen, intelligent, simple and convenient display screens have become a development trend.

In the related art, multiple display screens are often fixedly arranged on a console of a vehicle, to display vehicle information and/or multimedia information. However, the conventional installation and arrangement mode of multiple display screens is monotonous, which cannot meet a user's requirements on the positions, angles, display contents, etc. of the display screens, and is not intelligent.

SUMMARY

The present disclosure aims to solve, at least to some extent, one of the technical problems in the related art.

In view of this, a first objective of the present disclosure is to provide a method for controlling a multi-screen system, which allows the user to control the display screens to switch between different combination modes, so that the user's requirements on the positions, angles, display contents, etc. of the display screens can be met. This method is highly intelligent and provides the user with an optimal experience in the vehicle.

A second objective of the present disclosure is to provide an apparatus for controlling a multi-screen system.

A third objective of the present disclosure is to provide a vehicle.

To achieve the above objectives, an embodiment of a first aspect of the present disclosure provides a method for controlling a multi-screen system. The multi-screen system includes a plurality of display screens and a driving mechanism configured to drive the plurality of display screens to move in space. The method includes the following steps: acquiring a control instruction for the multi-screen system; and controlling the plurality of display screens to move according to the control instruction.

According to an embodiment of the present disclosure, the controlling the plurality of display screens to move according to the control instruction includes: generating a movement control instruction for each display screen, and executing the movement control instruction for each display screen.

According to an embodiment of the present disclosure, the generating a movement control instruction for each display screen includes: determining a target combination mode of the display screens in the multi-screen system; and generating the movement control instruction for each display screen according to the target combination mode.

According to an embodiment of the present disclosure, the generating the movement control instruction for each display screen according to the target combination mode includes: identifying a current combination mode of the multi-screen system; and generating the movement control instruction of the display screen according to the current combination mode and the target combination mode, where the movement control instruction includes a movement trajectory of the display screen.

According to an embodiment of the present disclosure, the generating the movement control instruction for each display screen according to the target combination mode includes: extracting a target position of each display screen from the target combination mode; acquiring a current position and an initial position of each display screen; and generating the movement control instruction of the display screen according to the current position, the initial position and the target position, where the movement control instruction includes a movement trajectory of the display screen.

According to an embodiment of the present disclosure, the target combination mode is a first combination mode, where in the first combination mode, spacings exist between the display screens.

According to an embodiment of the present disclosure, in the first combination mode, each display screen is at the initial position; and the executing the movement control instruction for each display screen includes: for each display screen, driving the driving mechanism of the display screen according to the movement control instruction for the display screen, to control each display screen to move from the current position to the initial position, to form the first combination mode.

According to an embodiment of the present disclosure, after the forming the first combination mode, the method further includes: controlling a part of the display screens to continue with at least one of rotation or telescoping movement, so that distances between the part of the display screens and a set reference are different from distances between the remaining display screens and the set reference.

According to an embodiment of the present disclosure, the method further includes: controlling the part of the display screens to move from the initial position in a direction away from the set reference by the same or different distances.

According to an embodiment of the present disclosure, the method further includes: adjusting displaying angles of the part of the display screens according to at least one of positions of the part of the display screens and a position of a pupil of a user facing the part of the display screens.

According to an embodiment of the present disclosure, the target combination mode is a second combination mode, where the second combination mode includes at least one tiled screen, and the tiled screen at least includes two first display screens to be tiled; and the executing the movement control instruction for each display screen includes: analyzing the movement control instructions for all the display screen, and identifying, from all the display screens, the first display screens included in each tiled screen; driving, for each tiled screen, the driving mechanisms of the first display screens according to the movement control instructions for the first display screens, to cause the first display screens to move, to obtain the tiled screen; and driving, for each of remaining second display screens other than the tiled screens, the driving mechanism of the second display screen according to the movement control instruction for the second display screen, to control the second display screen to move from the current position to the target position at which the second display screen is located in the target combination mode.

According to an embodiment of the present disclosure, the method further includes: receiving a position adjustment instruction for at least one tiled screen, and controlling, according to the position adjustment instruction, the at least one tiled screen to telescope back and forth, move left and right, or move up and down from the current position.

According to an embodiment of the present disclosure, the method further includes: the tiling including at least one of tiling the display screens in a first direction and tiling the display screens in a second direction.

According to an embodiment of the present disclosure, the method further includes: controlling landscape/portrait switching of each display screen in the tiled screen and/or adjusting a displaying angle of each display screen in the tiled screen.

According to an embodiment of the present disclosure, after the forming the tiled screen, the method further includes: dividing, according to at least one of a size of the tiled screen and a quantity of the display screens included in the tiled screen, information to be displayed on the tiled screen, to form information elements; and allocating a corresponding information element to each display screen in the tiled screen according to a position of each display screen of the tiled screen in the tiled screen and a displaying position corresponding to each information element.

According to an embodiment of the present disclosure, after the forming the target combination mode, the method further includes: acquiring status information of a vehicle, and determining a display content of each display screen according to the status information and the target combination mode.

According to an embodiment of the present disclosure, there are a plurality of driving mechanisms corresponding one-to-one to the display screens, and each of the driving mechanisms includes a rotating disc, a universal ball joint, a telescopic tubular column, and a direction control apparatus; one end of the rotating disc is connected to the display screen, and an other end of the rotating disc is connected to one end of the universal ball joint; one end of the telescopic tubular column is connected to an other end of the universal ball joint, and an other end of the telescopic tubular column is connected to the direction control apparatus; and the direction control apparatus is configured to control the display screen to move in space according to a received movement control instruction.

According to an embodiment of the present disclosure, the direction control apparatus includes a longitudinal guide rail, a transverse guide rail, a longitudinal electric motor, and a transverse electric motor; the longitudinal electric motor is configured to drive the display screen to move on the longitudinal guide rail; and the transverse electric motor is configured to drive the display screen to move on the transverse guide rail.

With the method for controlling a multi-screen system provided in the embodiments of the present disclosure, according to a control instruction issued by the user on the multi-screen system, a plurality of display screens can be controlled to move and form the target combination mode. In the embodiments of the present disclosure, because one driving mechanism is arranged for each display screen, the display screens can move in multiple directions to form a plurality of combination modes, so that the user's requirements on the positions, angles, display contents, etc. of the display screens can be met. This method is highly intelligent and provides the user with an optimal experience in the vehicle.

An embodiment of a second aspect of the present disclosure provides an apparatus for controlling a multi-screen system. The multi-screen system includes a plurality of display screens and a driving mechanism configured to drive the plurality of display screens to move in space. The apparatus includes: an acquisition module, configured to acquire a control instruction for the multi-screen system; and a control module, configured to control the plurality of display screens to move according to the control instruction.

According to an embodiment of the present disclosure, the control module is further configured to generate a movement control instruction for each display screen, and executing the movement control instruction for each display screen.

According to an embodiment of the present disclosure, the control module is further configured to: determine a target combination mode of the display screens in the multi-screen system; and generate the movement control instruction for each display screen according to the target combination mode.

According to an embodiment of the present disclosure, the control module is further configured to: identify a current combination mode of the multi-screen system; and generate the movement control instruction of the display screen according to the current combination mode and the target combination mode, where the movement control instruction includes a movement trajectory of the display screen.

According to an embodiment of the present disclosure, the control module is further configured to: extract a target position of each display screen from the target combination mode; acquiring a current position and an initial position of each display screen; and generate the movement control instruction of the display screen according to the current position, the initial position and the target position, where the movement control instruction includes a movement trajectory of the display screen.

According to an embodiment of the present disclosure, the target combination mode is a first combination mode, where in the first combination mode, spacings exist between the display screens.

According to an embodiment of the present disclosure, in the first combination mode, each display screen is at the initial position.

According to an embodiment of the present disclosure, the control module is further configured to: for each display screen, drive the driving mechanism of the display screen according to the movement control instruction for the display screen, to control each display screen to move from the current position to the initial position, to form the first combination mode.

According to an embodiment of the present disclosure, the control module is further configured to control a part of the display screens to continue with at least one of rotation or telescoping movement, so that distances between the part of the display screens and a set reference are different from distances between the remaining display screens and the set reference.

According to an embodiment of the present disclosure, the control module is further configured to control the part of the display screens to move from the initial position in a direction away from the set reference by the same or different distances.

According to an embodiment of the present disclosure, the control module is further configured to adjust displaying angles of the part of the display screens according to at least one of positions of the part of the display screens and a position of a pupil of a user facing the part of the display screens.

According to an embodiment of the present disclosure, the target combination mode is a second combination mode, where the second combination mode includes at least one tiled screen, and the tiled screen at least includes two first display screens to be tiled.

According to an embodiment of the present disclosure, the control module is further configured to: analyze the movement control instructions for all the display screen, and identify, from all the display screens, the first display screens included in each tiled screen; drive, for each tiled screen, the driving mechanisms of the first display screens according to the movement control instructions for the first display screens, to cause the first display screens to move, to obtain the tiled screen; and drive, for each of remaining second display screens other than the tiled screens, the driving mechanism of the second display screen according to the movement control instruction for the second display screen, to control the second display screen to move from the current position to the target position at which the second display screen is located in the target combination mode.

According to an embodiment of the present disclosure, the control module is further configured to: receive a position adjustment instruction for at least one tiled screen, and control, according to the position adjustment instruction, the at least one tiled screen to telescope back and forth, move left and right, or move up and down from the current position.

According to an embodiment of the present disclosure, the tiling includes at least one of tiling the display screens in a first direction and tiling the display screens in a second direction.

According to an embodiment of the present disclosure, the control module is further configured to: control landscape/portrait switching of each display screen in the tiled screen and/or adjusting a displaying angle of each display screen in the tiled screen.

According to an embodiment of the present disclosure, the control module is further configured to: divide, according to at least one of a size of the tiled screen and a quantity of the display screens included in the tiled screen, information to be displayed on the tiled screen, to form information elements; and allocate a corresponding information element to each display screen in the tiled screen according to a position of each display screen of the tiled screen in the tiled screen and a displaying position corresponding to each information element.

According to an embodiment of the present disclosure, the control module is further configured to: acquire status information of a vehicle, and determine a display content of each display screen according to the status information and the target combination mode.

According to an embodiment of the present disclosure, there are a plurality of driving mechanisms corresponding one-to-one to the display screens, and each of the driving mechanisms includes a rotating disc, a universal ball joint, a telescopic tubular column, and a direction control apparatus; one end of the rotating disc is connected to the display screen, and an other end of the rotating disc is connected to one end of the universal ball joint; one end of the telescopic tubular column is connected to an other end of the universal ball joint, and an other end of the telescopic tubular column is connected to the direction control apparatus; and the direction control apparatus is configured to control the display screen to move in space according to a received movement control instruction.

According to an embodiment of the present disclosure, the direction control apparatus includes a longitudinal guide rail, a transverse guide rail, a longitudinal electric motor, and a transverse electric motor; the longitudinal electric motor is configured to drive the display screen to move on the longitudinal guide rail; and the transverse electric motor is configured to drive the display screen to move on the transverse guide rail.

With the apparatus for controlling a multi-screen system provided in the embodiments of the present disclosure, the control module can control, according to a control instruction issued by the user on the multi-screen system and acquired by the acquisition module, a plurality of display screens to move and form the target combination mode. In the embodiments of the present disclosure, because one driving mechanism is arranged for each display screen, the display screens can move in multiple directions to form a plurality of combination modes, so that the user's requirements on the positions, angles, display contents, etc. of the display screens can be met. This method is highly intelligent and provides the user with an optimal experience in the vehicle.

An embodiment of a third aspect of the present disclosure provides a vehicle, including the apparatus for controlling a multi-screen system according to the second aspect.

REFERENCE NUMERALS

11—display screen; 12—rotating disc; 13—universal ball joint; 14—longitudinal electric motor; 15—transverse guide rail; 16—longitudinal guide rail; 17—transverse electric motor; 18—telescopic tubular column;

21—dashboard; 22—lower guide rail; 23—upper guide rail; 24—direction control apparatus.

DETAILED DESCRIPTION

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, and are intended to explain the present disclosure and cannot be construed as a limitation to the present disclosure.

A vehicle and a method and apparatus for controlling multi-screen system according to the embodiments of the present disclosure will be described below with reference to the accompanying drawings.

Figure 1:
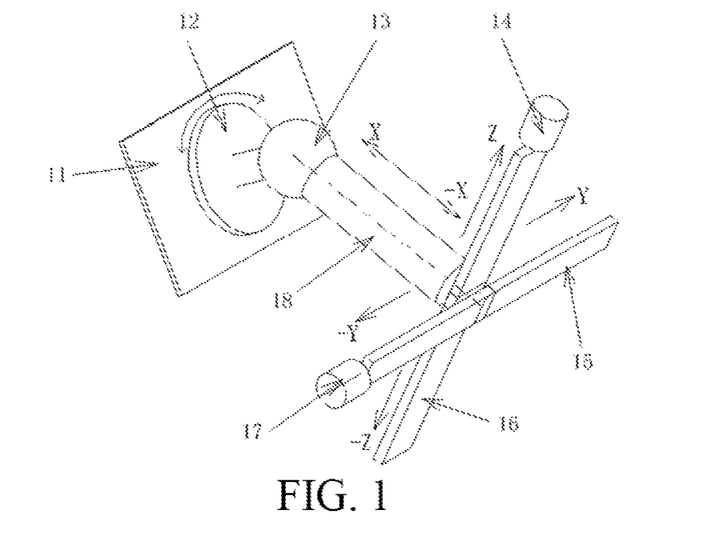
FIG. 1 is a schematic structural diagram of a driving mechanism in a multi-screen system according to some embodiments.

It should be noted that the multi-screen system in this embodiment includes a plurality of display screens and a driving mechanism corresponding to each display screen. The driving mechanism is configured to drive the display screen to move in space. As shown in FIG. 1, the driving mechanism includes a rotating disc 12, a universal ball joint 13, a longitudinal electric motor 14, a transverse guide rail 15, a longitudinal guide rail 16, a transverse electric motor 17, and a telescopic tubular column 18. One end of the rotating disc 12 is connected to the display screen 11, and an other end of the rotating disc 12 is connected to one end of the universal ball joint 13. One end of the telescopic tubular column 18 is connected to an other end of the universal ball joint, and an other end of the telescopic tubular column 18 is connected to the direction control apparatus. It should be understood that the universal ball joint 13 is configured to control landscape/portrait switching of the display screen 11 and/or adjust a displaying angle of the display screen 11. The telescopic tubular column 18 is configured to control the display screen to move away from or toward the transverse guide rail 15 and the longitudinal guide rail 16. The direction control apparatus is configured to control the display screen 11 to move in space according to a received movement control instruction, and includes a longitudinal electric motor 14, a transverse guide rail 15, a longitudinal guide rail 16, and a transverse electric motor 17. The longitudinal electric motor 14 is configured to drive the display screen 11 to move on the longitudinal guide rail 16. The transverse electric motor 17 is configured to drive the display screen 11 to move on the transverse guide rail 15.

Figure 2:
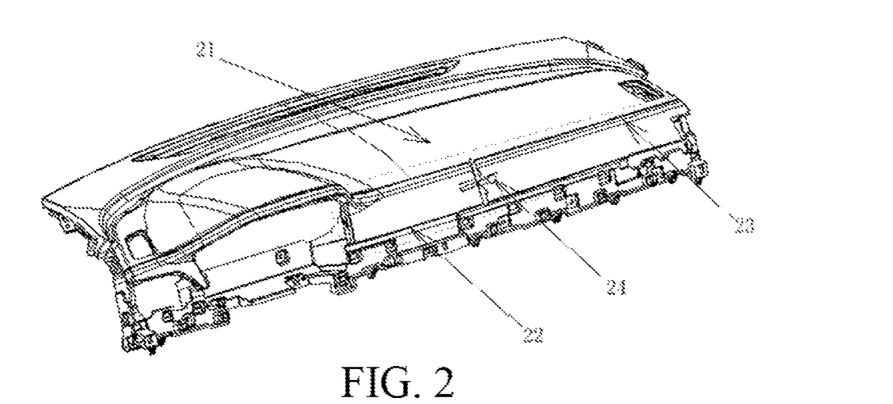
FIG. 2 is a schematic structural diagram of an arrangement of a multi-screen system in a vehicle according to some embodiments.

When the above multi-screen system is applied in a vehicle, the multi-screen system may be, but not limited to, arranged in a dashboard of a console of the vehicle. As shown in FIG. 2, a lower guide rail 22 and an upper guide rail 23 are arranged in a dashboard 21. Two ends of the longitudinal guide rail on the direction control apparatus 24 of the driving mechanism in the multi-screen system are respectively connected to the lower guide rail 22 and the upper guide rail 23, and are movable on the lower guide rail 22 and the upper guide rail 23. It should be understood that the display screens on the multi-screen system can be concealed in the dashboard 21.

It should be noted that driving the display screen to move in space by the driving mechanism in this embodiment includes driving the display screen to rotate and slide, rotate, telescope, move, slide, etc.

Figure 3:
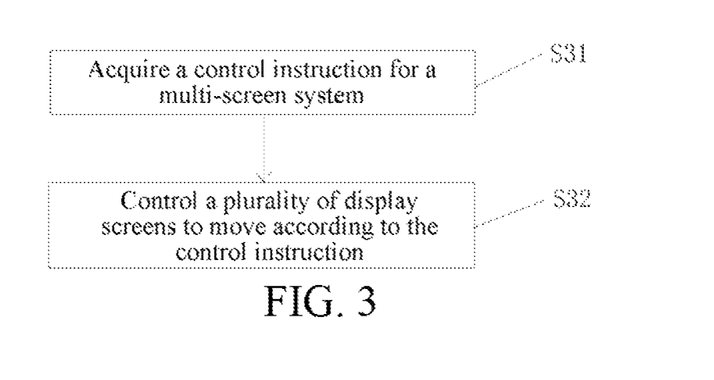
FIG. 3 is a schematic flowchart of a method for controlling a multi-screen system according to some embodiments.

FIG. 3 is a schematic flowchart of a method for controlling a multi-screen system according to some embodiments of the present disclosure. As shown in FIG. 3, the method includes the following steps:

S31: Acquire a control instruction for the multi-screen system.

It should be noted that the control instruction may be, but not limited to, delivered via a button, voice, gesture, application, intelligent key, etc. It should be understood that the control instruction may be an instruction on one display screen in the multi-screen system or an instruction on all the display screens in the multi-screen system. For example, when the multi-screen system includes three display screens and the three display screens are tiled together, an instruction of moving left may be delivered to the three display screens at the same time or may be delivered to only one of the display screens.

Figure 4:
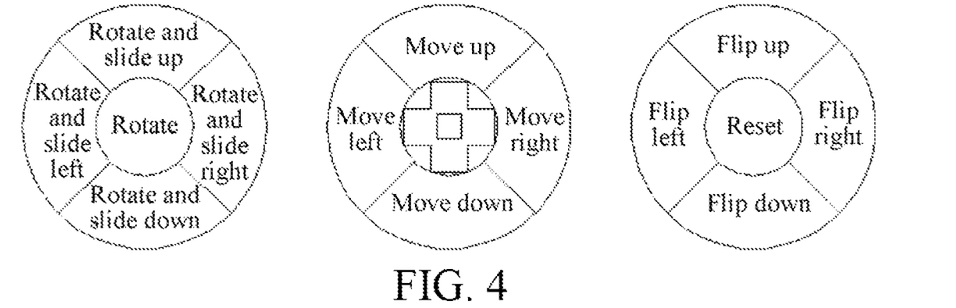
FIG. 4 is a schematic diagram of control buttons on a display screen in a method for controlling a multi-screen system according to some embodiments.

As a possible implementation, the control instruction is delivered via a button group. Specifically, as shown in FIG. 4, the user may select to control the display screen via a button/lever in the middle of the button group, or may control the display screen via a movement control button/lever in the periphery of the button group, for example, control the display screen to rotate and slide up, move up, or flip up.

As another possible implementation, the control instruction is delivered via a gesture. The multi-screen system stores user gestures captured in advance, and different gestures correspond to different control instructions. When the user needs to control the display screens in the multi-screen system, an image capturing apparatus on the multi-screen system or the display screen captures a gesture made by the user, and compares the gesture captured in real-time with a preset gesture, so as to determine a control instruction issued by the user.

As still another possible implementation, the control instruction may also be delivered via an intelligent key. Specifically, the intelligent key is used to directly interact with and control a plurality of display screens (including, but not limited to, two or more display screens) in the multi-screen system, and the intelligent key uses an integrated chip therein to establish communication with the display screen via radio frequency. In addition, the intelligent key integrates a plurality of buttons, and the display screen integrates at least one processor.

When a button on the intelligent key is operated, a transmitter on the intelligent key transmits a control instruction, and after receiving the control instruction, a receiver in the display screen sends the control instruction to the processor for processing, so that the processor responds to the button on the intelligent key.

For example, where there are two display screens, one may control the display screens by making a long or short press on a button for controlling the display screens on the intelligent key. The short press may be defined as a press lasting for shorter than 2 s, and the long press may be defined as a press lasting for longer than 2 s. When a short press is made on this button, one display screen is controlled; when a long press is made on this button, the two display screens are controlled. In addition, the controlled display screen(s) feeds back a signal to the intelligent key. In this way, different operations can be made depending on feedback statuses of the display screen(s) by using the same button.

In addition, a plurality of control buttons may further be mounted on the intelligent key. Each button is equipped with an independent mini transmitter. Each button corresponds to a processor of a display screen matching the button. The transmitter on the button transmits a signal to the processor in the display screen to control movement of the display screen. A plurality of display screens needing to be controlled simultaneously may be controlled simultaneously by a separate main button, but the plurality of display screens need to feed back a signal to the intelligent key when moving at the same time. Upon receiving this feedback signal, the intelligent key needs to disable buttons configured to separately control screen splitting, until a long press on the main button is detected.

For the implementations of delivering a control instruction via voice or an application, reference can be made to the above examples, so the details will not be detailed herein.

S32: Control the plurality of display screens to move according to the control instruction.

Once the control instruction issued by the user on the multi-screen system is acquired, a plurality of display screens may be controlled to move according to the control instruction.

It should be noted that the controlling the plurality of display screens to move may also be implemented by generating a movement control instruction for each display screen according to the control instruction issued by the user, and then executing the movement control instruction for each display screen, so that the plurality of display screens move at the same time, thereby reducing the time required for combination of the plurality of display screens and improving the efficiency. The generating the movement control instruction for each display screen may be implemented by determining a target combination mode of the display screens in the multi-screen system, and then generating the movement control instruction for each display screen according to the target combination mode. It should be understood that the target combination mode is a combination mode of the plurality of display screens which is expected by the user.

Specifically, after the control instruction issued by the user on the multi-screen system is acquired, the target combination mode of the display screens in the multi-screen system may be determined according to a relationship between the control instruction and a combination of the display screens in the multi-screen system.

Figure 6:
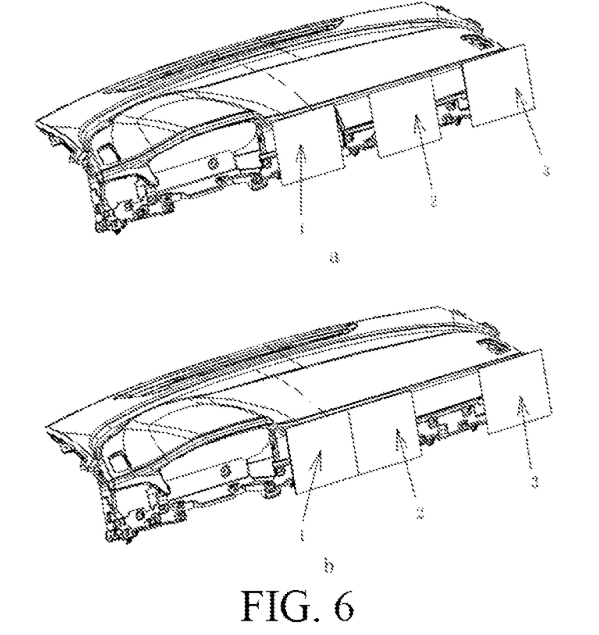
FIG. 6 is a schematic diagram of combination modes of display screens in a method for controlling a multi-screen system according to some embodiments.

For example, when the user issues a control instruction via a gesture, different gestures correspond to different control instructions, and different control instructions correspond to different display screen combination modes. After the control instruction is determined, a preset mapping relationship graph between gestures, control instructions, and combination modes may be queried to determine the target combination mode. FIG. 6(a) shows a target combination mode of three display screens, and FIG. 6(b) shows a target combination mode of the three display screens, which may specifically be determined according to actual situations and is not limited herein.

Further, once the target combination mode of the display screens in the multi-screen system is determined, the movement control instruction for each display screen may be generated.

Figure 5:
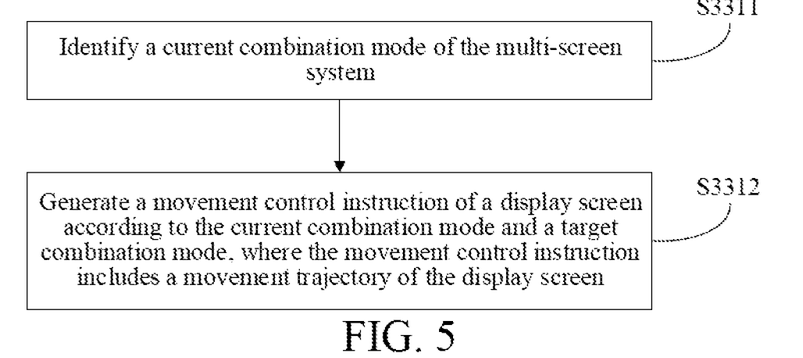
FIG. 5 is a schematic diagram of steps for generating a movement control instruction in a method for controlling a multi-screen system according to some embodiments.

As a possible implementation, this step may be implemented by performing the following steps. As shown in FIG. 5, this step includes:

S3311: Identify a current combination mode of the multi-screen system.

Specifically, for example, the current combination mode of the multi-screen system may be determined according to a target combination mode corresponding to a control instruction issued by the user last time.

S3312: Generate the movement control instruction of the display screen according to the current combination mode and the target combination mode, where the movement control instruction includes a movement trajectory of the display screen.

Specifically, for example, the current combination mode of the display screens may be compared with the target combination mode, to determine display screens that need to move and display screens that do not need to move; and then a movement control instruction for each display screen is generated. In this way, different movement control instructions can be determined according to real-time states of different display screens, thereby reducing the time required for combination of the plurality of display screens and improving the efficiency where the movement control instruction includes a movement trajectory of the display screen. It should be understood that the current combination mode is a mode of states of the plurality of display screens; and the movement control instruction for the display screen that does not need to move is keeping still in the original position.

For example, FIG. 6(a) shows the current combination mode of the multi-screen system, in which case a display screen 1, a display screen 2 and a display screen 3 are arranged at intervals; FIG. 6(b) shows the target combination mode of the multi-screen system, in which case the display screen 2 and the display screen 1 are tiled together. As illustrated by FIG. 6(a) and FIG. 6(b), the multi-screen display system can be switched from the current combination mode to the target combination mode by moving only the display screen 2. Therefore, the movement control instruction generated for the display screen includes: moving the display screen 2 toward the display screen 1, while keeping the display screen 1 and the display screen 3 still. In this case, a movement trajectory of the display screen 2 is a path of transverse movement of the display screen 2.

Further, the movement control instruction for each display screen may be executed, and then the plurality of display screens may be controlled to move, to form the target combination mode. Further, after the movement control instruction for each display screen is generated, the multi-screen system executes the movement control instruction for each display screen, and combines the plurality of display screens to form the target combination mode.

For example, still referring to FIG. 6, the movement control instruction generated in this case is moving the display screen 2 toward the display screen 1 while keeping the display screen 1 and the display screen 3 still, and the multi-screen system only needs to control the display screen 1, the display screen 2 and the display screen 3 according to the movement control instruction, for example, control the display screen 2 to move toward the display screen 1, until tiling of the display screen 2 and the display screen 1 is complete.

Based on the above, with the method for controlling a multi-screen system provided in the embodiments of the present disclosure, according to a control instruction issued by the user on the multi-screen system, a plurality of display screens can be controlled to move and form the target combination mode. In the embodiments of the present disclosure, because one driving mechanism is arranged for each display screen, the display screens can move in multiple directions to form a plurality of combination modes, so that the user's requirements on the positions, angles, display contents, etc. of the display screens can be met. This method is highly intelligent and provides the user with an optimal experience in the vehicle.

Figure 7:
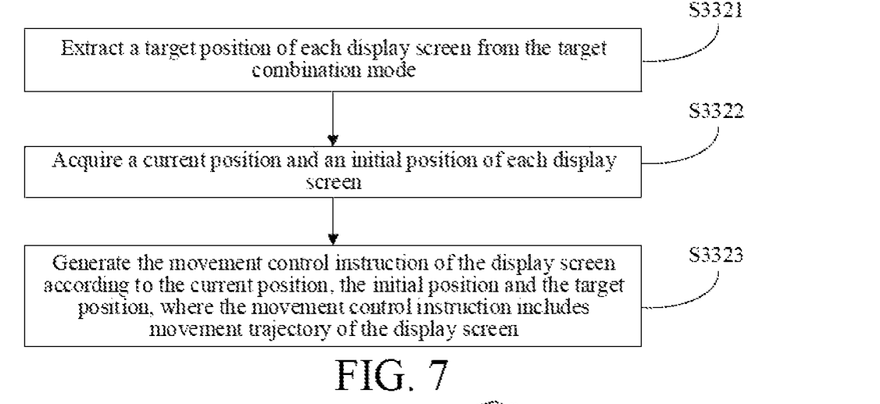
FIG. 7 is a schematic diagram of combination modes of display screens in a method for controlling a multi-screen system according to some embodiments.

In some embodiments, the generation of the movement control instruction for each display screen according to the target combination mode in the above step may also be implemented by performing the following steps. As shown in FIG. 7, this step includes:

S3321: Extract a target position of each display screen from the target combination mode.

Specifically, for example, the positions of the display screens in each combination mode are determined in advance, and after the target combination mode is acquired, the target position of each display screen can be directly obtained.

For example, still referring to FIG. 6, in some embodiments, as shown in FIG. 6(*a*), the positions of the display screen 1, the display screen 2 and the display screen 3 are respectively e, f and g; and that in figure b, the positions of the display screen 1, the display screen 2 and the display screen 3 are respectively x, y and z. When the target combination mode is the mode in FIG. a, the target positions of the display screen 1, the display screen 2 and the display screen 3 are respectively e, f and g; when the target mode is the mode in FIG. 6(*b*), the target positions of the display screen 1, the display screen 2 and the display screen 3 are respectively x, y and z.

S3322: Acquire a current position and an initial position of each display screen.

For details about this step, reference may be made to the description in step S3312, and therefore the details will be omitted here. It should be understood that the initial position in this embodiment refers to the position of each display screen in a default state, which may be the position of each display screen before delivery from the factory, or may be a default position preset by the user; and the current position refers to the position where the display screen currently is.

S3323: Generate the movement control instruction of the display screen according to the current position, the initial position and the target position, where the movement control instruction includes a movement trajectory of the display screen.

Specifically, the movement control instruction of the display screen generated according to the current position, the initial position and the target position may be controlling each display screen to move from its current position to its initial position, and then move from its initial position to its target position. It should be understood that the movement control instruction includes a movement trajectory of the display screen, for example, a path of moving leftward by a distance m and then moving upward by a distance n, and so on.

In some embodiments, the target combination mode may be, but not limited to, a first combination mode, where in the first combination mode, each display screen is at the initial position, and spacings exist between the display screens. Specifically, when each display screen is at the initial position in the first combination mode, the above step may also be: for each display screen, driving the driving mechanism of the display screen according to the movement control instruction for the display screen, to control each display screen to move from the current position to the initial position, to form the first combination mode.

For example, FIG. 6(*b*) shows the current combination mode of the multi-screen system, in which case the position of the display screen is the current position; figure a shows the first combination mode of the multi-screen system, in which case each display screen is at the initial position and spacings between the display screens are equal. When the combination mode of the multi-screen system is switched from FIG. b to FIG. a, the driving mechanism of the display screen 2 may be controlled to drive the display screen 2 to move transversely to a middle position between the display screen 1 and the display screen 3, the driving mechanisms corresponding to the display screen 1 and the display screen 3 may be controlled to not work, so as to form the first combination mode.

In some embodiments, as shown in FIG. 6(*a*), the setting of the initial position is for the following two purposes: 1. serving as a transition for each scene switching, so as to improve the operability of the scene switching; 2. using as a recommended movement scene for the user. In this scene, requirements of passengers in front and rear can be met at the same time. During braking, the display screen 1 may be used to display a panorama image, to allow the driver to check the environment nearby and thus smoothly drive the vehicle out of the garage; the display screen 3 may be used to display information about settings (e.g., an air conditioning interface), to allow a passenger in the front passenger seat to set the air conditioning function, air quality in the vehicle, and so on; the display screen 2 may be controlled via voice to display a destination, an optimal route, and so on. During driving, the display screen 1 may be used to display driving information (e.g., a navigation panel); the display screen 2 may be used to play a movie for passengers in rear; the display screen 3 is at the disposal of the passenger in the front passenger seat, allowing the passenger to browse web pages, play games, and so on.

In some embodiments, as shown in FIG. 6(*b*), more display screens are close to the driving seat. At the braking stage, the display screen 1 may be used to display a panorama image, the display screen 2 is used to display an image of a single direction of interest to the driver, and the display screen 3 is used to display an air conditioner setting interface. At the driving stage, the display screen 1 may be used to display driving information (e.g., navigation), the display screen 2 may be used to broadcast information (e.g., FM), and the display screen 3 is used to browse web pages (e.g., web pages about tourist attractions near the destination and hotel reservations). Definitely, the display screen 2 and the display screen 3 may also be tiled before being moved, and to switch from the initial position to this mode, one only needs to move the display screen 2 rightward by means of the longitudinal guide rail. In this case, more display screens can be used by the passenger in the front passenger seat, and all the setting operations may be handed over to the passenger in the front passenger seat, so that the driver can focus on driving. Definitely, the display screen 1 and the display screen 2 may also be tiled together during braking, so as to facilitate the driving of the vehicle out of the garage; and at the driving stage, the display screen 2 and the display screen 3 are tiled together to provide entertainment for the passenger in the front passenger seat. It should be understood that the display screens in this embodiment may be, but not limited to, bezel-free display screens, to achieve seamless tiling of the display screens, so that a seamless display effect can be achieved regardless of how many display screens are tiled.

Further, after the first combination mode is formed, a part of the display screens may further be controlled to continue with at least one of rotation or telescoping movement, so that distances between the part of the display screens and a set reference are different from distances between the remaining display screens and the set reference. It should be understood that the part of the display screens refers to a small part of all the display screens in the multi-screen system. For example, there are a total of ten display screens in the multi-screen system, and the part of the display screens may be any one or two of the ten display screens.

Specifically, for example, the part of the display screens may be controlled to move from the initial position in a direction away from the set reference by the same or different distances; or, displaying angles of the part of the display screens may be adjusted according to at least one of positions of the part of the display screens and a position of a pupil of a user facing the part of the display screens. It should be understood that in the process of controlling the part of the display screens to move from the initial position in a direction away from the set reference by the same or different distances, the displaying angles of the part of the display screens may also be adjusted according to the at least one of positions of the part of the display screens and a position of a pupil of a user facing the part of the display screens. In addition, the set reference refers to a position point selected in advance or in real time.

Figure 8:
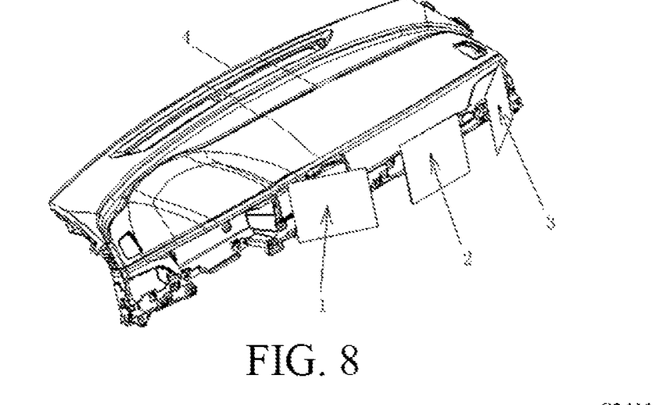
FIG. 8 is a schematic diagram of combination modes of display screens in a method for controlling a multi-screen system according to some embodiments.

For example, referring to FIG. 8 and FIG. 6(*a*), after the multi-screen system forms the combination mode shown in FIG. 6(*a*), one may continue to control the display screen 2 to move, for example, control the display screen 2 to extent out by a distance from the initial position, to move the display screen 2 away from a dashboard 4 (i.e., the set reference), so that a second distance between the display screen 2 and the dashboard 4, a first distance between the display screen 1 and the dashboard 4, and a third distance between the display screen 3 and the dashboard 4 are different from each other. In addition, the angles of the display screen 1 and the display screen 3 may further be adjusted, so that the display screen 1 and the display screen 3 face the user at an optimal angle.

In FIG. 8, the position of the display screen 2 is closer to the passenger than those of the display screen 1 and the display screen 3, and the display screen 1 and the display screen 3 are respectively rotated by an angle to respectively correspond to the driver and the passenger in the front passenger seat, so as to provide the user with a better experience. Movement from the initial position (i.e., FIG. 6(*a*)) to the combination mode shown in FIG. 8 is implemented in the following manner: a universal ball joint of the display screen 1 is rotated leftward by a certain angle, a rotating disc of the display screen 1 is rotated by an angle so as to face the driver at an optimal angle, a telescopic tubular column of the display screen 2 is stretched out by a certain distance, a universal ball joint of the display screen 3 is rotated rightward by a certain angle, and a rotating disc of the display screen 3 is rotated by an angle so as to face the passenger in the front passenger seat at an optimal angle. In this combination mode, not only the display screen 1 and the display screen 3 are at optimal angles, but also the display screen 2 can play music or listen to FM radio, which alleviates the problem that no sound source is provided in the middle of a vehicle in the prior art, and certainly allows the passengers in rear to use the display screen 2 for entertainment more conveniently.

It should be understood that during the adjustment of the angles of the display screens, for example, an infrared sensor in the multi-screen system senses a position of a pupil of the user, and the angles of the display screens are adjusted according to the position of the pupil of the user.

Figure 9:
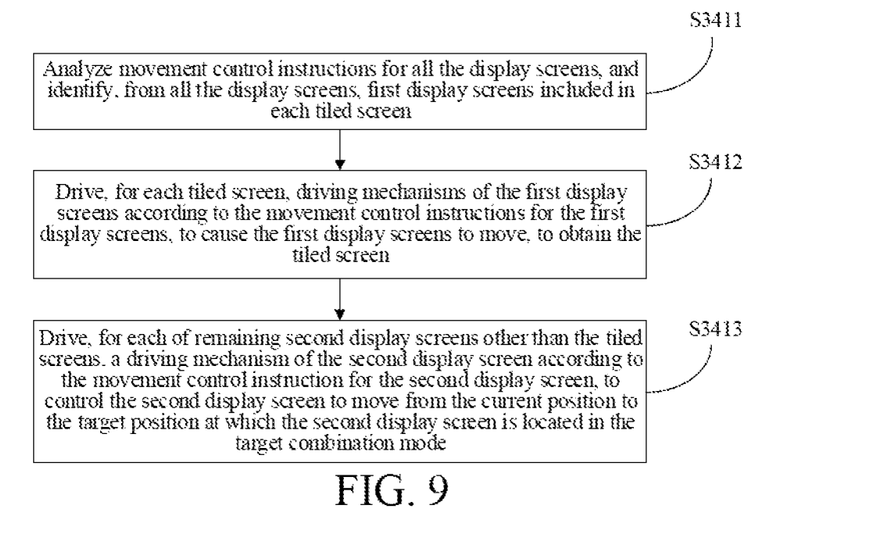
FIG. 9 is a schematic diagram of steps for forming a target combination mode in a method for controlling a multi-screen system according to some embodiments.

In some embodiments, the target combination mode is a second combination mode, where the second combination mode includes at least one tiled screen and the tiled screen at least includes two first display screens to be tiled. In this case, to improve the control efficiency and prevent the display screens to be tiled from interfering with the display screens that do not need to be tiled, the above step may be implemented by performing the following steps. As shown in FIG. 9, this step includes:

S3411: Analyze the movement control instructions for all the display screen, and identify, from all the display screens, the first display screens included in each tiled screen.

Specifically, by determining whether the target positions of the display screens in each path are neighboring to each other, it may be determined whether the two screens are tiled, and then the first display screens included in each tiled screen are identified.

S3412: Drive, for each tiled screen, the driving mechanisms of the first display screens according to the movement control instructions for the first display screens, to cause the first display screens to move, to obtain the tiled screen.

Specifically, for each tiled screen, the movement control instructions for the first display screens included therein are executed, and the driving mechanisms of the first display screens are controlled to drive the first display screens to move, until the tiling is complete. It should be understood that movements of the first display screens may be the same or different, which may specifically be determined according to actual situations.

S3413: Drive, for each of remaining second display screens other than the tiled screens, the driving mechanism of the second display screen according to the movement control instruction for the second display screen, to control the second display screen to move from the current position to the target position at which the second display screen is located in the target combination mode.

Specifically, for each of remaining second display screens other than the tiled screens, the movement control instruction for the second display screen is executed, and the driving mechanism of the second display screen is controlled to drive the second display screen to move until the target position is reached, that is to say, the second display screen is controlled to move from the current position to the target position at which the second display screen is located in the target combination mode.

Figure 10:
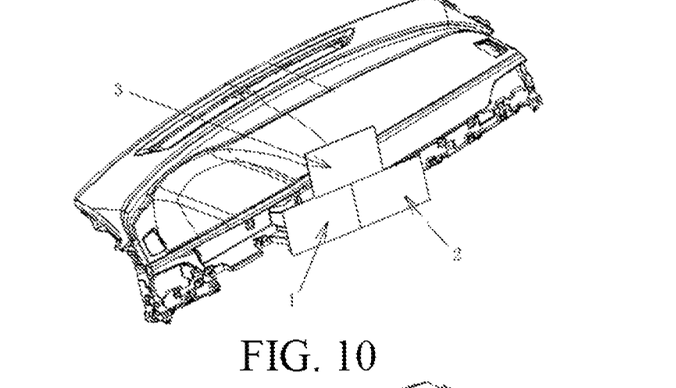
FIG. 10 is a schematic diagram of combination modes of display screens in a method for controlling a multi-screen system according to some embodiments.
Figure 11:
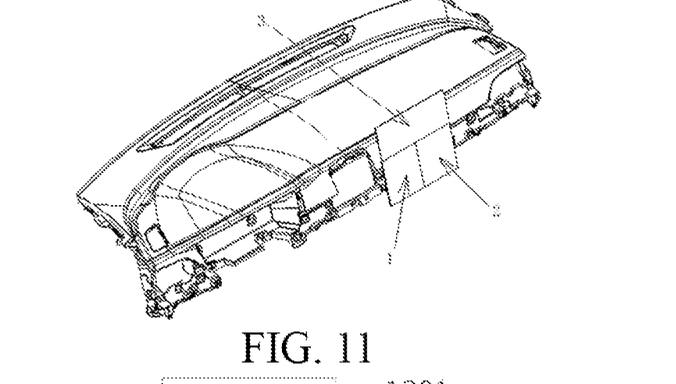
FIG. 11 is a schematic diagram of combination modes of display screens in a method for controlling a multi-screen system according to some embodiments.

It should be noted that the tiled screen in this embodiment may be obtained by tiling a plurality of display screens in landscape orientation, as indicated by the manner in which the display screen 1 and the display screen 2 are tiled in FIG. 10; or may be obtained by tiling a plurality of display screens in portrait orientation, as indicated by the manner in which the display screen 1 and the display screen 2 are tiled in FIG. 11. The tiling manner may be determined according to actual situations, and is not limited herein. In addition, in the process of controlling tiling of the display screens in the multi-screen system, all the display screens may be controlled to be tiled, to meet the demand of the driver or passenger for a large display screen; or the part of the display screens may be controlled to be tiled, to respectively meet the demands of the driver and passenger for display screens;

or any display screens may be controlled to be tiled. The tiling manner may specifically be determined according to actual situations, and is not limited herein.

It should be understood that in the process of controlling tiling of the display screens, a position adjustment instruction for at least one tiled screen may further be received, and according to the position adjustment instruction, the at least one tiled screen may be controlled to telescope back and forth, move left and right, or move up and down from the current position, so as to adjust the positions of the display screens during movement. In addition, all the tiled screens may further be controlled to move as a whole, so that a unity formed by all the tiled screens is moved to a position expected by the user, so as to meet the user's demand. It should be noted that, the tiling includes tiling the display screens in a first direction and tiling the display screens in a second direction, or tiling the display screens in the first direction, or tiling the display screens in the second direction.

For example, referring to FIG. 10, the target combination mode shown in FIG.

10 is the second combination mode, where the display screen 1, the display screen 2 and the display screen 3 are tiled together to form a tiled screen. FIG. 6(*a*) shows the current combination mode of the display screen 1, the display screen 2 and the display screen 3. There is only one tiled screen in this target mode; therefore, to execute movement control on each display screen, it is only necessary to identify the display screen 1, the display screen 2 and the display screen 3 in the tiled screen, and then control, according to the movement control instruction for each display screen, the driving mechanism corresponding to each display screen to work to drive each display screen to move, until the tiling is complete. In the process of controlling the multi-screen system to switch from the combination mode in figure a in FIG. 6 to the combination mode in FIG. 10, the display screen 2 may be controlled to move in the first direction (e.g., transversely), and the display screen 3 may be first moved in the second direction (e.g., longitudinally) and then moved in the first direction, so as to form the combination mode in FIG. 10.

Further, landscape/portrait switching of each display screen in the tiled screen may further be controlled and/or a displaying angle of each display screen in the tiled screen may further be adjusted, to ensure that upper edges of the plurality of display screens are always on the same line, so that after being rotated to any position, the display screens will not block the sight of the driver or passenger, which complies with regulatory requirements.

For example, referring to FIG. 11 and FIG. 10, on the basis of the combination mode shown in FIG. 10, the display screen 1 and the display screen 2 may be controlled to undergo landscape/portrait switching. For example, the display screen 1 is first controlled to move downward; then the display screen 1 is controlled to undergo landscape/portrait switching; and then the display screen 1 is controlled to move upward. Similarly, corresponding operations may also be performed on the display screen 2 to achieve the tiled screen combination mode shown in FIG. 11. It should be understood that in the process of controlling the display screens 1 and 2 to move, the display screens 1 and 2 may further be fine-tuned as required, so as to obtain the combination mode in FIG. 11. Referring to FIG. 6, if the combination mode of the display screen 1 and the display screen 2 is the mode shown in FIG. 6, after controlling the display screen 1 and the display screen 2 to undergo landscape/portrait switching and/or adjusting the displaying angle of each display screen in the tiled screen, it needs to be ensured that the upper edges of the display screen 1 and the display screen 2 are finally on the same straight line. In addition, the displaying angle of each display screen in the tiled screen may further be adjusted as required, so that the tiled screen reaches an optimal displaying angle. For example, the angles of one or more of the display screens are adjusted so that the display screen(s) face toward the driver.

It should be understood that in the process of controlling the display screen to undergo landscape/portrait switching, an upper border line or a lower border line of each display screen may also be used as a reference, and the upper border line or lower border line is always on the same line before and after rotation, so as to maintain the optimal viewing angle for the user, thereby improving user experience to the greatest extent.

In some embodiments, after the forming the tiled screen, the method further includes: dividing, according to at least one of a size of the tiled screen and a quantity of the display screens included in the tiled screen, information to be displayed on the tiled screen, to form information elements; and then allocating a corresponding information element to each display screen in the tiled screen according to a position of each display screen of the tiled screen in the tiled screen and a displaying position corresponding to each information element.

For example, referring to FIG. 6(*b*), the display screen 1 and the display screen 2 form a tiled screen. After the two display screens are tiled, information to be displayed on the tiled screen may be divided into a plurality of information elements, for example, divided into two information elements, and one information element is allocated to each of the display screen 1 and the display screen 2. It should be understood that during the allocation process, the display position corresponding to each information element needs to be considered. In addition, if the number of information elements is 1, the information element may be displayed on the tiled screen formed by the display screen 1 and the display screen 2. For example, when the information element is navigation information, the navigation information may be displayed directly on the tiled screen formed by the display screen 1 and the display screen 2.

It should be understood that the display screens in this embodiment may be, but not limited to, bezel-free display screens, so as to facilitate tiling and display.

In some embodiments, after the target combination mode is formed, status information of a vehicle may further be acquired, and a display content of each display screen is determined according to the status information and the target combination mode. The status information of the vehicle may include, but not limited to, vehicle speed, tire pressure, fuel consumption, multimedia information, etc. It should be understood that each display screen may separately display a content; or the entire tiled screen may display the same content; or a part of the display screens display one content, and the other display screens display another content.

The specific content displayed on the display screen may be determined according to actual situations and is not limited herein.

For example, referring to FIG. 10, in this case, the display screen 3 may be used to display driving information such as vehicle speed, tire pressure and fuel consumption, the display screen 1 is used to map information on the dashboard of the vehicle, and the display screen 2 is used to listen to FM radio or play music or provide other entertainments. In addition, during braking, the display screen 3 may be used to display a front-view image, and the display screen 1 and the display screen 2 are used to display a single image; during reversing, the display screen 1 may be used to display a rear-view image, and the display screen 2 and the display screen 3 display a single image.

Referring to FIG. 11, the display screen 1 and the display screen 2 are in portrait orientation, the display screen 3 are in landscape orientation, and the three display screens may be used together for display. With this combination mode, full-screen image display can be realized, thereby improving user experience to the greatest extent.

To implement the above embodiments, the present disclosure further provides an apparatus for controlling a multi-screen system. The multi-screen system includes a plurality of display screens and a driving mechanism configured to drive the plurality of display screens to move in space.

Figure 12:
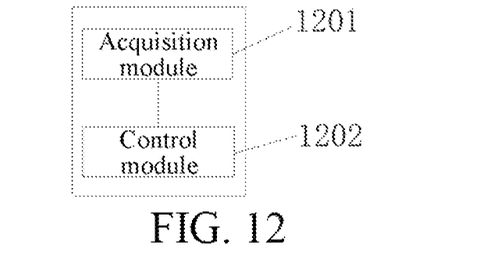
FIG. 12 is a schematic structural diagram of an apparatus for controlling a multi-screen system according to an embodiment of the present disclosure.

FIG. 12 is a schematic structural diagram of an apparatus for controlling a multi-screen system according to an embodiment disclosed in the present disclosure. As shown in FIG. 12, the apparatus includes: an acquisition module 1201, configured to acquire a control instruction for the multi-screen system; and a control module 1202, configured to control the plurality of display screens to move according to the control instruction.

Further, the control module 1202 is further configured to: generate a movement control instruction for each display screen, and execute the movement control instruction for each display screen.

Further, the control module 1202 is further configured to: determine a target combination mode of the display screens in the multi-screen system; and generate the movement control instruction for each display screen according to the target combination mode.

Further, the control module 1202 is further configured to: identify a current combination mode of the multi-screen system; and generate the movement control instruction of the display screen according to the current combination mode and the target combination mode, where the movement control instruction includes a movement trajectory of the display screen.

Further, the control module 1202 is further configured to: extract a target position of each display screen from the target combination mode; acquire a current position and an initial position of each display screen; and generate the movement control instruction of the display screen according to the current position, the initial position and the target position, where the movement control instruction includes a movement trajectory of the display screen.

Further, the target combination mode is a first combination mode, where in the first combination mode, spacings exist between the display screens.

Further, in the first combination mode, each display screen is at the initial position; and the control module 1202 is further configured to: for each display screen, drive the driving mechanism of the display screen according to the movement control instruction for the display screen, to control each display screen to move from the current position to the initial position, to form the first combination mode.

Further, the control module 1202 is further configured to: control a part of the display screens to continue with at least one of rotation or telescoping movement, so that distances between the part of the display screens and a set reference are different from distances between the remaining display screens and the set reference.

Further, the control module 1202 is further configured to: control the part of the display screens to move from the initial position in a direction away from the set reference by the same or different distances.

Further, the control module 1202 is further configured to: adjust displaying angles of the part of the display screens according to at least one of positions of the part of the display screens and a position of a pupil of a user facing the part of the display screens.

Further, the target combination mode is a second combination mode, where the second combination mode includes at least one tiled screen, and the tiled screen at least includes two first display screens to be tiled.

The control module 1202 is further configured to: analyze the movement control instructions for all the display screen, and identify, from all the display screens, the first display screens included in each tiled screen; drive, for each tiled screen, the driving mechanisms of the first display screens according to the movement control instructions for the first display screens, to cause the first display screens to move, to obtain the tiled screen; and drive, for each of remaining second display screens other than the tiled screens, the driving mechanism of the second display screen according to the movement control instruction for the second display screen, to control the second display screen to move from the current position to the target position at which the second display screen is located in the target combination mode.

Further, the control module 1202 is further configured to: receive a position adjustment instruction for at least one tiled screen, and control, according to the position adjustment instruction, the at least one tiled screen to telescope back and forth, move left and right, or move up and down from the current position.

Further, the tiling includes at least one of tiling the display screens in a first direction and tiling the display screens in a second direction.

Further, the control module 1202 is further configured to: control landscape/portrait switching of each display screen in the tiled screen and/or adjust a displaying angle of each display screen in the tiled screen.

Further, the control module 1202 is further configured to: divide, according to at least one of a size of the tiled screen and a quantity of the display screens included in the tiled screen, information to be displayed on the tiled screen, to form information elements; and allocate a corresponding information element to each display screen in the tiled screen according to a position of each display screen of the tiled screen in the tiled screen and a displaying position corresponding to each information element.

Further, the control module 1202 is further configured to: acquire status information of a vehicle, and determine a display content of each display screen according to the status information and the target combination mode.

Further, there are a plurality of driving mechanisms corresponding one-to-one to the display screens, and each of the driving mechanisms includes a rotating disc, a universal ball joint, a telescopic tubular column, and a direction control apparatus; one end of the rotating disc is connected to the display screen, and an other end of the rotating disc is connected to one end of the universal ball joint; one end of the telescopic tubular column is connected to an other end of the universal ball joint, and an other end of the telescopic tubular column is connected to the direction control apparatus; and the direction control apparatus is configured to control the display screen to move in space according to a received movement control instruction.

Further, the direction control apparatus includes a longitudinal guide rail, a transverse guide rail, a longitudinal electric motor, and a transverse electric motor; the longitudinal electric motor is configured to drive the display screen to move on the longitudinal guide rail; and the transverse electric motor is configured to drive the display screen to move on the transverse guide rail.

It should be understood that the above apparatus is used to execute the method in the above embodiments, and implementation principles and technical effects of the corresponding program modules in the apparatus are similar to those described in the above method. For the working process of the apparatus, reference may be made to the corresponding process in the above method, so the details will not be repeated here.

Based on the above, with the apparatus for controlling a multi-screen system provided in the embodiments of the present disclosure, the control module can control, according to a control instruction issued by the user on the multi-screen system and acquired by the acquisition module, a plurality of display screens to move and form the target combination mode. In the embodiments of the present disclosure, because one driving mechanism is arranged for each display screen, the display screens can move in multiple directions to form a plurality of combination modes, so that the user's requirements on the positions, angles, display contents, etc.

of the display screens can be met. This method is highly intelligent and provides the user with an optimal experience in the vehicle.

Figure 13:
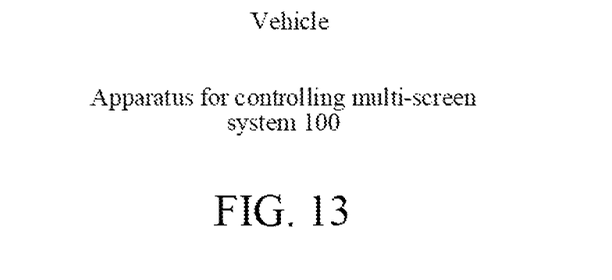
FIG. 13 is a schematic structural diagram of a vehicle according to an embodiment of the present disclosure.

To implement the above embodiments, the present disclosure further provides a vehicle. As shown in FIG. 13, the vehicle includes the apparatus 100 for controlling a multi-screen system according to the above embodiments.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure.

In addition, terms "first" and "second" are used merely for the purpose of description, and shall not be construed as indicating or implying relative importance or implying a quantity of indicated technical features. Therefore, a feature limited by "first" or "second" may explicitly or implicitly include one or more of the features. In the descriptions of the present disclosure, "a plurality of" means two or more, unless otherwise definitely and specifically limited.

In the present disclosure, unless otherwise explicitly specified or defined, the terms such as "install", "connect", "connection", and "fix" should be understood in a broad sense. For example, the connection may be a fixed connection, a detachable connection, or an integral connection; or the connection may be a mechanical connection or an electrical connection; or the connection may be a direct connection, an indirect connection through an intermediate medium, internal communication between two components, or an interaction relationship between two components. A person of ordinary skill in the art may understand the specific meanings of the foregoing terms in the present disclosure according to specific situations.

In the present disclosure, unless otherwise explicitly specified or defined, the first feature being located "above" or "below" the second feature may be the first feature being in a direct contact with the second feature, or the first feature being in an indirect contact with the second feature through an intermediary. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is right below the second feature or at an inclined bottom of the second feature, or may merely indicate that the horizontal position of the first feature is lower than that of the second feature.

In the descriptions of this specification, descriptions of a reference term such as "an embodiment," "some embodiments," "an example," "a specific example," or "some examples" means that a feature, structure, material, or characteristic that is described with reference to the embodiment or the example is included in at least one embodiment or example of the present disclosure. In this specification, schematic descriptions of the foregoing terms are not necessarily directed at the same embodiment or example. Besides, the specific features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. A method for controlling a multi-screen system of a vehicle, wherein the multi-screen system comprises a plurality of display screens and a driving mechanism configured to drive the plurality of display screens to move in space, the method comprising:
    acquiring a control instruction for the multi-screen system; and
    controlling the plurality of display screens to move according to the control instruction,
    wherein the controlling the plurality of display screens to move according to the control instruction comprises:
    generating a movement control instruction for each display screen, and executing the movement control instruction for each display screen,
    wherein the generating a movement control instruction for each display screen comprises:
    determining a target combination mode of the display screens in the multi-screen system, wherein under the target combination mode, the display screens have at least two different orientations of the target combination mode, wherein the driving mechanism automatically drives at least one of the display screens to a first orientation on a transverse guide rail, and automatically drives at least one of the display screens to a second orientation on a longitudinal rail, wherein the transverse guide rail and the longitudinal rail are separately provided for each display screen, and the transverse guide rail and the longitudinal rail are respectively connected to a lower guide rail and an upper guide rail on the vehicle; and
generating the movement control instruction for each display screen according to the target combination mode.

2. The method according to claim 1, wherein the generating the movement control instruction for each display screen according to the target combination mode comprises:
identifying a current combination mode of the multi-screen system; and
generating the movement control instruction of the display screen according to the current combination mode and the target combination mode, where the movement control instruction comprises a movement trajectory of the display screen.

3. The method according to claim 1, wherein the generating the movement control instruction for each display screen according to the target combination mode comprises:
extracting a target position of each display screen from the target combination mode;
acquiring a current position and an initial position of each display screen; and
generating the movement control instruction of the display screen according to the current position, the initial position and the target position, where the movement control instruction comprises a movement trajectory of the display screen.

4. The method according to claim 1, wherein the target combination mode is a first combination mode, where in the first combination mode, spacings exist between the display screens.

5. The method according to claim 4, wherein in the first combination mode, each display screen is at the initial position; and
the executing the movement control instruction for each display screen comprises:
for each display screen, driving the driving mechanism of the display screen according to the movement control instruction for the display screen, to control each display screen to move from the current position to the initial position, to form the first combination mode.

6. The method according to claim 5, wherein after the forming the first combination mode, the method further comprises:
controlling a part of the display screens to continue with at least one of rotation or telescoping movement, so that distances between the part of the display screens and a set reference are different from distances between the remaining display screens and the set reference.

7. The method according to claim 6, wherein the method further comprises:
controlling the part of the display screens to move from the initial position in a direction away from the set reference by the same or different distances.

8. The method according to claim 6, wherein the method further comprises:
adjusting displaying angles of the part of the display screens according to at least one of positions of the part of the display screens and a position of a pupil of a user facing the part of the display screens.

9. The method according to claim 1, wherein:
the target combination mode is a second combination mode, the second combination mode comprises at least one tiled screen, and the tiled screen comprises at least two first display screens to be tiled; and
the executing the movement control instruction for each display screen comprises:
analyzing the movement control instructions for all the display screens, and identifying, from all the display screens, the first display screens comprised in each tiled screen;
driving, for each tiled screen, the driving mechanism of the first display screens according to the movement control instructions for the first display screens, to cause the first display screens to move, to obtain the tiled screen; and
driving, for each of remaining second display screens other than the tiled screens, the driving mechanism of the second display screen according to the movement control instruction for the second display screen, to control the second display screen to move from the current position to the target position at which the second display screen is located in the target combination mode.

10. The method according to claim 9, wherein the method further comprises:
receiving a position adjustment instruction for at least one tiled screen, and controlling, according to the position adjustment instruction, the at least one tiled screen to telescope back and forth, move left and right, or move up and down from the current position.

11. The method according to claim 9, wherein the method further comprises:
the tiling comprises at least one of tiling the display screens in a first direction and tiling the display screens in a second direction.

12. The method according to claim 9, wherein the method further comprises:
controlling landscape or portrait switching of each display screen in the tiled screen and adjusting a displaying angle of each display screen in the tiled screen,
wherein the tiled screen includes one landscape oriented display screen and two portrait oriented display screens.

13. The method according to claim 9, wherein after the forming the tiled screen, the method further comprises:
dividing, according to at least one of a size of the tiled screen and a quantity of the display screens comprised in the tiled screen, information to be displayed on the tiled screen, to form information elements; and
allocating a corresponding information element to each display screen in the tiled screen according to a position of each display screen of the tiled screen in the tiled screen and a displaying position corresponding to each information element.

14. The method according to claim 1, wherein after the forming the target combination mode, the method further comprises:
acquiring status information of the vehicle, and determining a display content of each display screen according to the status information and the target combination mode.

15. The method according to claim 1, wherein:
there are a plurality of driving mechanisms corresponding one-to-one to the display screens, and each of the driving mechanisms comprises a rotating disc, a universal ball joint, a telescopic tubular column, and a direction control apparatus;
one end of the rotating disc is connected to the display screen, and an other end of the rotating disc is connected to one end of the universal ball joint;

one end of the telescopic tubular column is connected to an other end of the universal ball joint, and an other end of the telescopic tubular column is connected to the direction control apparatus; and the direction control apparatus is configured to control the display screen to move in space according to a received movement control instruction.

16. The method according to claim 15, wherein:

the direction control apparatus comprises the longitudinal guide rail, the transverse guide rail, a longitudinal electric motor, and a transverse electric motor;

the longitudinal electric motor is configured to drive the display screen to move on the longitudinal guide rail; and the transverse electric motor is configured to drive the display screen to move on the transverse guide rail.

17. An apparatus for controlling a multi-screen system of a vehicle, wherein the multi-screen system comprises a plurality of display screens and a driving mechanism configured to drive the plurality of display screens to move in space, the apparatus comprising:

an acquisition module, configured to acquire a control instruction for the multi-screen system; and a control module, configured to control the plurality of display screens to move according to the control instruction, wherein to control the plurality of display screens to move according to the control instruction comprises:

to generate a movement control instruction for each display screen, and executing the movement control instruction for each display screen, wherein to generate a movement control instruction for each display screen comprises:

to determine a target combination mode of the display screens in the multi-screen system, wherein under the target combination mode, the display screens have at least two different orientations of the target combination mode, wherein the driving mechanism automatically drives at least one of the display screens to a first orientation on a transverse guide rail, and automatically drives at least one of the display screens to a second orientation on a longitudinal rail, wherein the transverse guide rail and the longitudinal rail are separately provided for each display screen, and the transverse guide rail and the longitudinal rail are respectively connected to a lower guide rail and an upper guide rail on the vehicle; and to generate the movement control instruction for each display screen according to the target combination mode.

18. A vehicle, comprising an apparatus for controlling a multi-screen system, the multi-screen system comprising a plurality of display screens and a driving mechanism configured to drive the plurality of display screens to move in space, and the apparatus comprising:

an acquisition module, configured to acquire a control instruction for the multi-screen system; and a control module, configured to control the plurality of display screens to move according to the control instruction, wherein to control the plurality of display screens to move according to the control instruction comprises:

to generate a movement control instruction for each display screen, and executing the movement control instruction for each display screen, wherein to generate a movement control instruction for each display screen comprises:

to determine a target combination mode of the display screens in the multi-screen system, wherein under the target combination mode, the display screens have at least two different orientations of the target combination mode, wherein the driving mechanism automatically drives at least one of the display screens to a first orientation on a transverse guide rail, and automatically drives at least one of the display screens to a second orientation on a longitudinal rail, wherein the transverse guide rail and the longitudinal rail are separately provided for each display screen, and the transverse guide rail and the longitudinal rail are respectively connected to a lower guide rail and an upper guide rail on the vehicle; and to generate the movement control instruction for each display screen according to the target combination mode.

* * * * *